United States Patent
Casado Montero

(10) Patent No.: US 10,472,073 B2
(45) Date of Patent: Nov. 12, 2019

(54) AIR CONDITIONING SYSTEM

(71) Applicant: AIRBUS OPERATIONS S.L., Madrid (ES)

(72) Inventor: Carlos Casado Montero, Madrid (ES)

(73) Assignee: Airbus Operations S.L., Madrid (ES)

(*) Notice: Subject to any disclaimer, the term of this patent is extended or adjusted under 35 U.S.C. 154(b) by 78 days.

(21) Appl. No.: 15/395,425

(22) Filed: Dec. 30, 2016

(65) Prior Publication Data
US 2017/0190430 A1   Jul. 6, 2017

(30) Foreign Application Priority Data

Dec. 30, 2015 (EP) .................................... 15382678

(51) Int. Cl.
*B64D 13/08* (2006.01)
*B64D 13/06* (2006.01)

(52) U.S. Cl.
CPC ............. *B64D 13/08* (2013.01); *B64D 13/06* (2013.01); *B64D 2013/0603* (2013.01); *B64D 2013/0618* (2013.01); *B64D 2013/0644* (2013.01); *B64D 2013/0648* (2013.01); *B64D 2013/0688* (2013.01); *Y02T 50/56* (2013.01)

(58) Field of Classification Search
CPC . B64D 13/06; B64D 13/08; B64D 2013/0603
USPC .......................................................... 62/172
See application file for complete search history.

(56) References Cited

U.S. PATENT DOCUMENTS

| | | | | |
|---|---|---|---|---|
| 5,086,622 A * | 2/1992 | Warner | .................. | B64D 13/06 62/172 |
| 5,373,707 A * | 12/1994 | Ostersetzer | ............ | B64D 13/06 62/401 |
| 5,442,905 A * | 8/1995 | Claeys | ................... | B64D 13/06 454/71 |
| 5,452,573 A * | 9/1995 | Glickstein | ................. | F02C 6/08 60/39.183 |
| 5,709,103 A | 1/1998 | Williams | | |
| 5,860,283 A * | 1/1999 | Coleman | ................ | B64D 13/06 62/402 |
| 5,911,388 A * | 6/1999 | Severson | ............... | B64D 13/06 244/118.5 |

(Continued)

FOREIGN PATENT DOCUMENTS

| | | |
|---|---|---|
| EP | 1 752 377 | 2/2007 |
| EP | 1 777 156 | 4/2007 |

(Continued)

OTHER PUBLICATIONS

Extended Search Report for EP 15382678.9, dated Jun. 9, 2016, 9 pages.

*Primary Examiner* — Henry T Crenshaw
(74) *Attorney, Agent, or Firm* — Nixon & Vanderhye P.C.

(57) ABSTRACT

An air conditioning system 1 for a cabin 10 including a pressurized air source 2, a cooling air source 3, a main heat exchanger 4, a compressor 5, a manifold 6 and a mixing chamber 7. An inlet 43 to a cold side of the main heat exchanger 4 is in fluid communication with the cooling air source 3. An inlet 41 of a hot side of the main heat exchanger 4 is in fluid communication with the pressurized air source 2. An inlet 51 of the compressor is in fluid communication with the outlet 44 of the cold side of the main heat exchanger 4.

19 Claims, 3 Drawing Sheets

(56) References Cited

U.S. PATENT DOCUMENTS

| | | | | |
|---|---|---|---|---|
| 6,182,435 | B1 * | 2/2001 | Niggemann | B64D 41/00 60/266 |
| 6,427,471 | B1 * | 8/2002 | Ando | B64D 13/06 62/402 |
| 6,519,969 | B2 * | 2/2003 | Sauterleute | B64D 13/06 62/401 |
| 9,784,638 | B1 * | 10/2017 | Followell | B64D 13/06 |
| 2003/0051500 | A1 * | 3/2003 | Asfia | B64D 13/06 62/402 |
| 2009/0084122 | A1 | 4/2009 | Casado Montero | |
| 2009/0117840 | A1 | 5/2009 | Kresser et al. | |
| 2016/0311538 | A1 * | 10/2016 | Bruno | B64D 13/06 |
| 2017/0170494 | A1 * | 6/2017 | Lents | B64D 13/06 |

FOREIGN PATENT DOCUMENTS

| | | |
|---|---|---|
| ES | 2 349 206 | 12/2010 |
| FR | 2 829 466 | 3/2003 |
| WO | WO 2008/014912 | 2/2008 |

* cited by examiner

AIR CONDITIONING SYSTEM

RELATED APPLICATION

This application claims priority to European Patent Application No. EP15382678.9 filed Dec. 30, 2015, the entirety of which is incorporated by reference.

TECHNICAL FIELD OF THE INVENTION

The present invention is related to the field of aircraft engines and, in particular, relates to the field of cooling systems using bleed air from aircraft engines.

BACKGROUND OF THE INVENTION

The cabin of a modern passenger aircraft is air-conditioned usually both when the aircraft is flying and is on the ground by means of the aircraft's air conditioning system. The aircraft air conditioning system is supplied with pressurized bleed air taken from a compressor of an aircraft engine, such as a turbofan, or the compressor in the aircraft's Auxiliary Power Unit.

Typically, the bleed air passes through an "air cycle machine" that comprises, among others, one or several heat exchangers, a compressor and one or several turbines that cool the bleed air to a desired lower temperature and pressure. In this type of air conditioning system, the air exiting the air cycle machine follows an inverse Brayton cycle and is usually mixed in a mixing chamber with air recirculated from the cabin. Pipes exiting the mixing chamber may receive air at different temperatures from a manifold, in such a way that they blow air into the cabin at different temperatures.

SUMMARY OF THE INVENTION

The present invention uses air from a ram air channel to cool the heat exchangers of the air cycle machine to be compressed and used later on to feed the cabin either via mixing chambers or via an air temperature manifold, since this temperature will be higher than the one selected for the cabin. In this manner the drag is reduced as well as the power needed in the overall cycle, which is improved and therefore achieving lower fuel consumption.

According to a first aspect, the invention provides an air conditioning system for a cabin of an aircraft, the air conditioning system comprising: i a pressurized air source which, when in an operative mode, provides work air with a pressure higher than 100 kPa; ii a cooling air source, suitable for providing cooling air; iii a main heat exchanger with a cold side and a hot side, the hot side comprising an inlet and an outlet and the cold side comprising an inlet and an outlet, in such a way that the inlet of the cold side of the main heat exchanger is in fluid communication with the cooling air source, and the inlet of the hot side of the main heat exchanger is in fluid communication with the pressurized air source; iv a secondary duct which bleeds part of the air from the outlet of the cold side of the main heat exchanger or from the inlet of the cold side of the main heat exchanger; v a first valve configured to allow or restrict the passage of air bled to the secondary duct; and vi a compressor with an inlet and an outlet, the inlet of the compressor being located in fluid communication with, the outlet of the cold side of the main heat exchanger or the inlet of the cold side of the main heat exchanger, a second valve being located in fluid communication with the outlet of the compressor; wherein the outlet of the compressor is in fluid communication with mixing means which in turn are in fluid communication with the cabin.

This air conditioning system allows using less air from the air pressurized source than the air conditioning systems known in the state of the art, since part of the air obtained from the atmosphere by the cooling air source is conveniently treated and added to the air to be introduced in the cabin.

The mixing device may comprise a manifold having at least one inlet and at least one outlet, wherein at least one inlet of the manifold is in fluid communication with the outlet of the compressor, each inlet of the manifold comprising a third valve; a mixing chamber comprising at least one inlet and at least one outlet, one of the inlets of the mixing chamber being fed by the outlet of the hot side of the main heat exchanger, and the at least one outlet of the mixing chamber being in fluid communication with the cabin; wherein at least an outlet of the manifold is in fluid communication with an outlet of the mixing chamber, this outlet of the manifold comprising a fourth valve; and wherein each outlet of the mixing chamber is in fluid communication with the cabin.

The mixing device may also comprise a manifold, comprising at least one inlet and at least one outlet, wherein at least one inlet of the manifold is in fluid communication with the outlet of the compressor, each inlet of the manifold comprising a third valve; a mixing chamber comprising at least two inlets and a plurality of outlets, one of the inlets of the mixing chamber being fed by the outlet of the hot side of the main heat exchanger, one of the inlets of the mixing chamber being fed by the and the plurality of outlets of the mixing chamber being in fluid communication with the cabin; wherein at least an outlet of the manifold is in fluid communication with an outlet of the mixing chamber, this outlet of the manifold comprising a fourth valve; and wherein each outlet of the mixing chamber is in fluid communication with the cabin.

The air conditioning system may further comprise a bypass channel which puts the pressurized air source in fluid communication with the manifold and a fifth valve configured to allow or restrict the pass of air bled to the bypass channel.

The mixing device may also comprise a mixing chamber comprising at least two inlets and a plurality of outlets, one of the inlets of the mixing chamber being fed by the outlet of the hot side of the main heat exchanger, one of the inlets of the mixing chamber being fed by the and the plurality of outlets of the mixing chamber being in fluid communication with the cabin.

These air conditioning systems have a better control of air temperature which is intended to be introduced in the cabin, as different temperatures may be obtained by the suitable setting of the outlets of the mixing chamber.

The air conditioning system may further comprise a secondary heat exchanger by means of which heat is transferred from the outlet of the compressor to the air in the secondary duct.

The air conditioning system may further comprise a turbine with an inlet and an outlet, the inlet of the turbine being in fluid communication with an outlet of the cabin, wherein the compressor is driven by energy produced in the turbine.

This air conditioning system demands lower energy consumption, as the compressor does not need an external energy source to be moved.

The air conditioning system may further comprise a secondary heat exchanger by means of which heat is transferred from the outlet of the cabin to the air in the secondary duct.

At least a second outlet of the manifold may be in fluid connection with a second outlet of the mixing chamber.

The main heat exchanger may be comprised in an air cycling machine.

DESCRIPTION OF THE DRAWINGS

These and other characteristics and advantages of the invention will be clearly understood in view of the detailed description of the invention and further in view of the preferred embodiments of the invention, with reference to the drawings. Preferred embodiments are given just as examples and are not intended to limit the scope of the present invention.

DETAILED DESCRIPTION OF THE INVENTION

Having outlined the object of the invention, specific non-limitative embodiments are described hereinafter.

Figure 1:
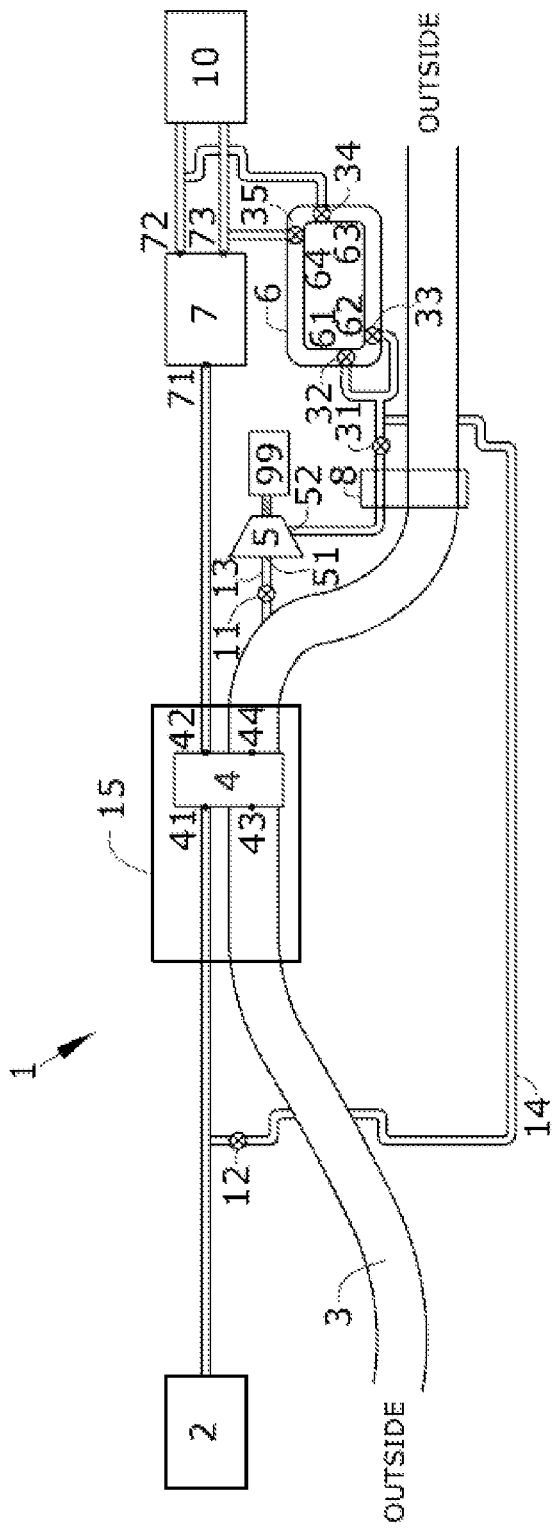
FIG. 1 is a schematic diagram of a first embodiment of an air conditioning system.

FIG. 1 shows a particular embodiment of an air conditioning system 1 that provides work air for a cabin 10 of an aircraft such as for passengers. The air conditioning system 1 comprising: a pressurized air source 2 which, while in an operative mode, provides work air at a pressure higher than 100 kPa; a cooling air source 3 suitable for providing cooling air; a main heat exchanger 4 with a cold side and a hot side, wherein the hot side comprise an inlet 41 and an outlet 42 and the cold side comprises an inlet 43 and an outlet 44, and the main heat exchanger is included in an air cycling machine 15; a compressor 5 with an inlet 51 and an outlet 52; a second valve 31 in fluid communication with the outlet 52 of the compressor; and a mixing chamber 7 comprising an inlet 71 and two outlets 72, 73.

The inlet 43 of the cold side of the main heat exchanger 4 is in fluid communication with the cooling air source 3, and the inlet 41 of the hot side of the main heat exchanger 4 is in fluid communication with the pressurized air source 2. The main heat exchanger 4 thus allow a heat exchanging between the cooling air obtained in the cooling air source 3 and the work air obtained in the pressurized air source 2.

The inlet 51 of the compressor is in fluid communication with the outlet 44 of the cold side of the main heat exchanger 4, so that the cooling air exiting the main heat exchanger 4 enters the compressor 5.

The compressor 5 may be driven by the energy provided by an electric motor 99. The compressor 5 may also or alternatively drive energy provided by the air cycling machine 15.

The air conditioning system 1 may comprise a secondary duct 13 which bleeds part of the air from the outlet 44 of the cold side of the main heat exchanger 4. Further, the air conditioning system 1 may comprise a first valve 11 configured to allow or restrict the pass of air bled to the secondary duct 13.

The air conditioning system 1 may further comprise a secondary heat exchanger 8. The secondary heat exchanger 8 transfers heat from the outlet 52 of the compressor 5 to the air exiting the cold side of the main heat exchanger 4.

The air conditioning system 1 may further comprise a bypass channel 14 which puts the pressurized air source 2 in fluid communication with the manifold 6 and a fifth valve 12 configured to allow or restrict the pass of air bled to the bypass channel 14.

The air conditioning system 1 may further comprise a manifold 6, comprising two inlets 61, 62 and two outlets 63, 64, wherein the two inlets 61, 62 of the manifold 6 are in fluid communication with the outlet 52 of the compressor, the second valve 31 being located between the two inlets 61, 62 of the manifold 6 and the outlet 52 of the compressor. Each inlet 61, 62 of the manifold 6 comprises a third valve 32, 33 and each outlet 63, 64 of the manifold 6 comprises a fourth valve 34, 35.

Each outlet 63, 64 of the manifold 6 may be in fluid communication with an outlet 72, 73 of the mixing chamber 7. Each outlet 72, 73 of the mixing chamber 7 may be in fluid communication with the cabin 10. Outlets 63, 64 of the manifold are used to control a final temperature obtained in the different outlets 72, 73 of the mixing chamber 7. By feeding each outlet 72, 73 of the mixing chamber 7 with one outlet 63, 64 of the manifold 6 which is at different temperature, different temperatures are obtained in each of the outlets 72, 73 of the mixing chamber 7. In other embodiments, the manifold 6 comprises more outlets.

Figure 2:
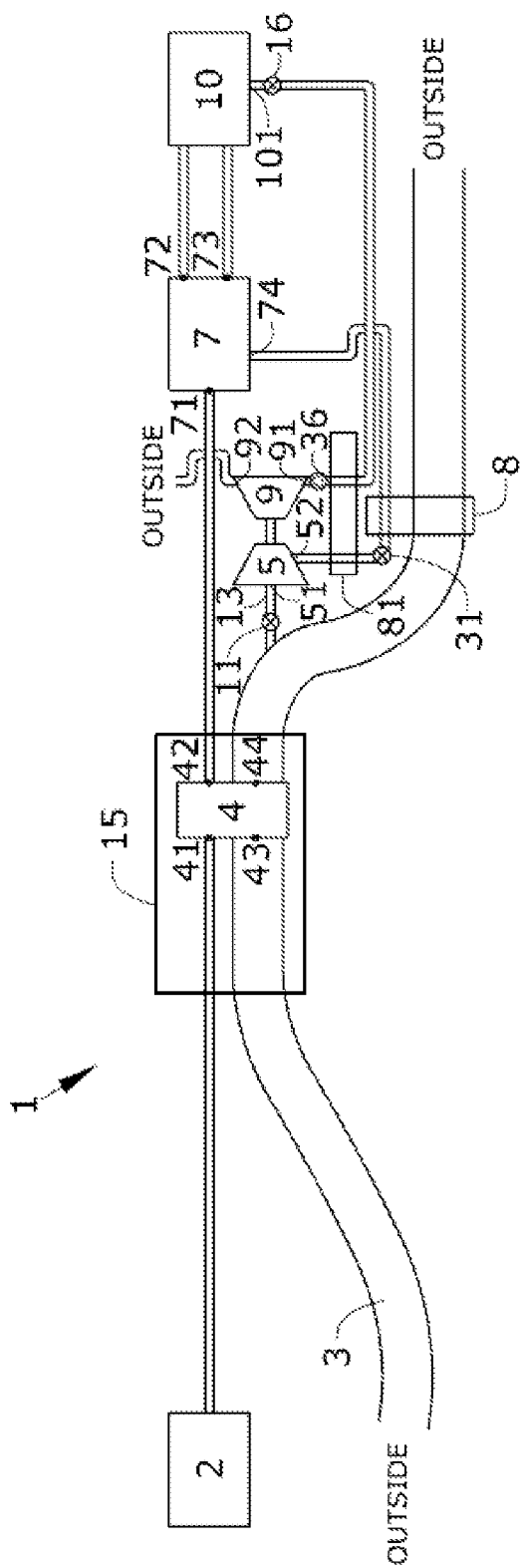
FIG. 2 is a schematic diagram of a second embodiment of an air conditioning system.

FIG. 2 shows another embodiment of an air conditioning system 1. This embodiment does not comprise a bypass channel, or a manifold. Air enters and exits the cabin 10 so that it is renewed and conditioned. In consequence, the cabin comprises inlets and one outlet 101. In this embodiment, the outlet 101 of the cabin comprises a sixth valve 16.

The compressor 5 is drive by a turbine 9. This turbine 9 comprises an inlet 91 and an outlet 92. The inlet 91 of the turbine is in fluid communication with the outlet 101 of the cabin 10, so it is fed by air exiting the cabin 10. Energy contained in the air exiting the cabin and being evacuated to atmospheric air drives the turbine 9. By using energy in the air exiting the cabin to drive the turbine, energy need to be taken from other sources and thus there is an energy savings with respect to the energy generators in the aircraft. Alternatively or in addition, the turbine 9 may be driven by air exiting the main heat exchanger 4 or by another source of energy in the aircraft.

A third heat exchanger 81 may be placed such that heat is transferred between the inlet of the turbine 91 and the exit of the compressor 52. A one way valve 36 is placed in the inlet of the turbine 91.

The outlet 52 of the compressor is in fluid communication with an inlet 74 of the mixing chamber. The other inlet 71 of the mixing chamber 7 is fed by the outlet 42 of the hot side of the main heat exchanger 4, and the outlets 72, 73 of the mixing chamber are in fluid communication with the cabin 10.

Because of this arrangement, fresh air coming from the cooling air source 3 is available to be part of the temperature control, and part of it may be introduced in the mixing chamber 7.

Figure 3:
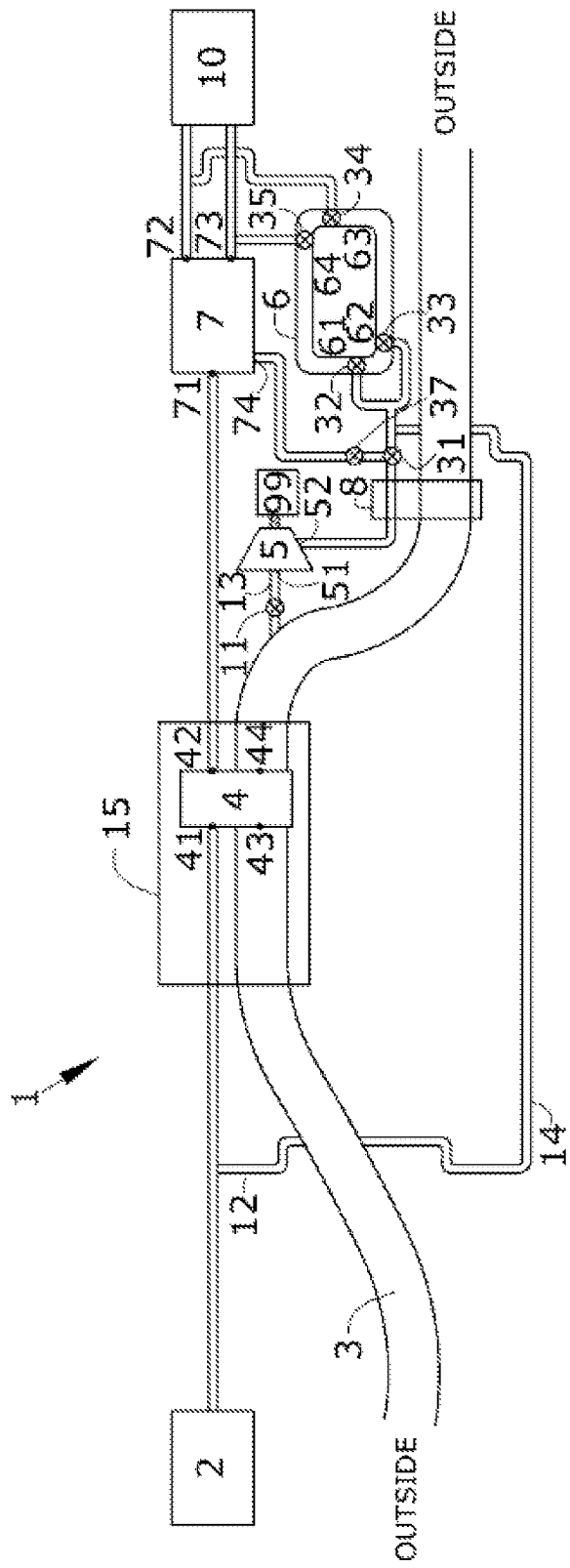
FIG. 3 is a schematic diagram of a third embodiment of an air conditioning system.

FIG. 3 shows another embodiment of an air conditioning system 1 according to the invention. This air conditioning system 1 is similar to the one shown in FIG. 1, but the outlet 52 of the compressor 5 is in fluid communication with both an inlet 74 of the mixing chamber and with an inlet 61 of the manifold 6. There is a seventh valve 37 in the inlet 74 of the mixing chamber 7 to control this flow between the outlet 52 of the compressor 5 and the inlet 74 of the mixing chamber 7. The main heat exchanger 4 may be comprised in an air cycling machine 15.

While exemplary embodiments of the present inventions are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiments. In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise.

The invention claimed is:

1. An air conditioning system configured to provide air to a cabin of an aircraft, the air conditioning system comprising:
    a pressurized air source configured to provide work air with a pressure higher than 100 kPa while in an operating mode;
    a cooling air source configured to provide cooling air;
    a main heat exchanger with a cold side and a hot side, the hot side comprising an inlet and an outlet, and the cold side comprising an inlet and an outlet, wherein the inlet of the cold side of the main heat exchanger is in fluid communication with the cooling air source and the inlet of the hot side of the main heat exchanger is in fluid communication with the pressurized air source;
    a secondary duct through which flows air bled from the outlet of the cold side of the main heat exchanger or from the inlet of the cold side of the main heat exchanger,
    a first valve configured to allow or restrict passage of air bled to the secondary duct;
    a compressor with an inlet and an outlet, the inlet of the compressor in fluid communication with the outlet of the cold side of the main heat exchanger or the inlet of the cold side of the main heat exchanger, such that the air bled from the outlet of the cold side of the main heat exchanger flows both through the secondary duct and the compressor;
    a second valve in fluid communication with the outlet of the compressor; and
    a mixing assembly including an inlet in fluid communication with the outlet of the hot side of the main heat exchanger and an outlet in fluid communication with the cabin,
    wherein the outlet of the mixing assembly is in fluid communication with an outlet of the second valve such that the air flowing from the outlet of the second valve enters the outlet of the mixing assembly and first mixes with the work air flowing through the outlet of the mixing assembly to form an air mixture which flows into the cabin.

2. The air conditioning system according to claim 1, wherein the mixing assembly comprises:
    a manifold comprising at least one inlet and at least one outlet, wherein the at least one inlet of the manifold is in fluid communication with the outlet of the compressor, and each of the at least one inlet of the manifold comprises a third valve;
    a mixing chamber including at least one inlet and at least one outlet, wherein one of the inlets of the mixing chamber is fed by the outlet of the hot side of the main heat exchanger, and the at least one outlet of the mixing chamber is in fluid communication with the cabin;
    wherein the at least one outlet of the manifold is in fluid communication with an outlet of the mixing chamber, the outlet of the manifold comprising a fourth valve; and
    wherein each of the outlets of the mixing chamber is in fluid communication with the cabin.

3. The air conditioning system according to claim 1, wherein the mixing assembly comprises:
    a manifold comprising at least one inlet and at least one outlet,
    wherein at least one inlet of the manifold is in fluid communication with the outlet of the compressor, each inlet of the manifold comprising a third valve;
    a mixing chamber comprising at least two inlets and a plurality of outlets, one of the inlets of the mixing chamber being fed by the outlet of the hot side of the main heat exchanger, one of the inlets of the mixing chamber being fed by the plurality of outlets of the mixing chamber being in fluid communication with the cabin;
    wherein the at least one outlet of the manifold is in fluid communication with an outlet of the mixing chamber, and the outlet of the manifold comprises a fourth valve; and
    wherein each outlet of the mixing chamber is in fluid communication with the cabin.

4. The air conditioning system according to claim 2, further comprising a bypass channel configured to connect the pressurized air source to the manifold, and
    a fifth valve configured to allow or restrict passage of air bled to the bypass channel.

5. The air conditioning system according to claim 1, wherein the mixing assembly includes a mixing chamber comprising at least two inlets and a plurality of outlets, one of the at least two of inlets of the mixing chamber being fed by the outlet of the hot side of the main heat exchanger, and another one of the inlets of the mixing chamber being fed by the outlet of the compressor.

6. The air conditioning system according to claim 1, further comprising a secondary heat exchanger configured to transfer heat from air passing through the outlet of the compressor to air in the secondary duct.

7. The air conditioning system according to claim 1, further comprising a turbine with an inlet and an outlet, the inlet of the turbine being in fluid communication with an outlet of the cabin, wherein the compressor is driven by energy produced in the turbine.

8. An air conditioning system configured to provide air to a cabin of an aircraft, the air conditioning system comprising:
    a pressurized air source configured to provide work air with a pressure higher than 100 kPa while in an operating mode;
    a cooling air source configured to provide cooling air;
    a main heat exchanger with a cold side and a hot side, the hot side comprising an inlet and an outlet, and the cold side comprising an inlet and an outlet, wherein the inlet of the cold side of the main heat exchanger is in fluid communication with the cooling air source and the inlet of the hot side of the main heat exchanger is in fluid communication with the pressurized air source;
    a secondary duct through which flows air bled from the outlet of the cold side of the main heat exchanger or from the inlet of the cold side of the main heat exchanger, a first valve configured to allow or restrict passage of air bled to the secondary duct; and a compressor with an inlet and an outlet, the inlet of the compressor in fluid communication with the outlet of the cold side of the main heat exchanger or the inlet of the cold side of the main heat exchanger;

a second valve in fluid communication with the outlet of the compressor;

wherein the outlet of the compressor is in fluid communication with a mixing assembly which in turn is in fluid communication with the cabin;

a turbine with an inlet and an outlet, wherein the inlet of the turbine is in fluid communication with an outlet of the cabin and the compressor is driven by energy produced in the turbine, and a secondary heat exchanger which transfers heat from air flowing through the outlet of the cabin to air in the secondary duct.

9. The air conditioning system according to claim 1, wherein the compressor is driven by an electric motor.

10. The air conditioning system according to claim 1, wherein at least a second outlet of the manifold is in fluid connection with a second outlet of the mixing chamber.

11. The air conditioning system according to claim 1, wherein the main heat exchanger is included in an air cycle machine.

12. The air conditioning system according to claim 1, wherein the compressor is driven by an air cycling machine.

13. An aircraft comprising an air conditioning system according to claim 1.

14. An aircraft air conditioning system:
a work air passage having an inlet coupled to a pressurized air source and an outlet coupled to a cabin in an aircraft;
a cooling air passage having an inlet coupled to a cooling air source;
a main heat exchanger including a hot air passage and a cold air passage, wherein the hot air passage is included with the work air passage and the cold air passage is included with the cooling air passage;
a secondary air flow passage including an inlet in fluid communication with the cooling air passage downstream of the cold air passage and an outlet in fluid communication with the work air passage downstream of the hot air passage, wherein cooling air flows from the cooling air passage, through the secondary air flow passage and mixes with work air flowing through the work air passage towards the cabin, and
a compressor in the secondary air flow passage, wherein the compressor is configured to compress the cooling air flowing through the secondary air flow passage.

15. The aircraft air conditioning system of claim 14, further comprising a mixing chamber in the work air passage and downstream of the main heat exchanger and upstream of the cabin, wherein the mixing chamber receives and mixes the work air and the compressor cooling air from the secondary air flow passage.

16. The aircraft air conditioning system of claim 14, further comprising a mixing chamber in the work air passage and downstream of the main heat exchanger and upstream of the cabin, wherein the mixing chamber divides the work air passage into a plurality of work air passages each distributing the work air to a different section of the cabin, and wherein the outlet of the secondary air flow passage is a plurality of outlets each connected to a respective one of the plurality of work air passages.

17. The aircraft air conditioning system of claim 16, wherein the secondary air flow passage includes an air distribution manifold receiving the compressed cooling air from the compressor and distributing the compressed cooling air to each of the plurality of work air passages.

18. The aircraft air conditioning system of claim 14, further comprising a turbine driving the compressor wherein the turbine has an inlet configured to receive air evacuated from the cabin and is driven by the air evacuated from the cabin.

19. The aircraft air conditioning system of claim 14, further comprising a second heat exchanger having a hot air passage included in the secondary air passage and downstream of the compressor and a cool air passage in the cooling air passage.

* * * * *